United States Patent
Kaminski et al.

(10) Patent No.: US 10,025,947 B1
(45) Date of Patent: Jul. 17, 2018

(54) SYSTEM AND METHOD TO PRODUCE A VIRTUALLY TRUSTED DATABASE RECORD

(71) Applicant: IMS Health Incorporated, Danbury, CT (US)

(72) Inventors: Thomas Kaminski, Lawrenceville, NJ (US); Matthew Adlai-Gail, Princeton Junction, NJ (US); John O'Connell, West Windsor, NJ (US)

(73) Assignee: IMS HEALTH INCORPORATED, Danbury, CT (US)

( * ) Notice: Subject to any disclaimer, the term of this patent is extended or adjusted under 35 U.S.C. 154(b) by 61 days.

(21) Appl. No.: 15/016,310

(22) Filed: Feb. 5, 2016

Related U.S. Application Data

(60) Provisional application No. 62/260,912, filed on Nov. 30, 2015.

(51) Int. Cl.
| | |
|---|---|
| *G06F 7/04* | (2006.01) |
| *G06F 21/62* | (2013.01) |
| *G06F 17/30* | (2006.01) |

(52) U.S. Cl.
CPC ...... *G06F 21/6218* (2013.01); *G06F 17/3089* (2013.01); *G06F 17/30241* (2013.01); *G06F 17/30339* (2013.01)

(58) Field of Classification Search
CPC .......... G06F 21/6218; G06F 17/30241; G06F 17/30339; G06F 17/3089
See application file for complete search history.

(56) References Cited

U.S. PATENT DOCUMENTS

| | | | |
|---|---|---|---|
| 6,202,070 B1* | 3/2001 | Nguyen | G06F 8/61 |
| 2002/0059264 A1* | 5/2002 | Fleming | G06Q 40/02 |
| 2007/0162456 A1* | 7/2007 | Agassi | G06F 17/30867 |
| 2009/0164979 A1* | 6/2009 | Fischer | G06F 11/3476 717/128 |
| 2010/0174720 A1* | 7/2010 | Mack | G06F 17/30312 707/741 |
| 2011/0231447 A1* | 9/2011 | Starkey | G06F 17/30575 707/792 |
| 2012/0109906 A1* | 5/2012 | Wagner | G06F 17/30575 707/690 |
| 2013/0036092 A1* | 2/2013 | Lafont | G06F 17/30132 707/634 |

(Continued)

*Primary Examiner* — Techane Gergiso
(74) *Attorney, Agent, or Firm* — Maldjian Law Group LLC

(57) ABSTRACT

System and method to produce a virtual trusted database record, the method including receiving, by a processor coupled to a user-facing communication interface and to a memory, a request for the virtual trusted database record, the virtual trusted database record including a plurality of record data fields. Then identifying a business context of the request and assigning a respective priority to each of the record data fields, based upon the business context. Mapping each of the record data fields to a respective database source for data to populate the respective data field, the respective database source having a predetermined level of authoritativeness based upon the assigned priority. Retrieving data for each data field from the database source mapped to the respective data field, and assembling the retrieved data for each data field to produce the virtual trusted database record.

19 Claims, 7 Drawing Sheets

(56) References Cited

U.S. PATENT DOCUMENTS

| | | | |
|---|---|---|---|
| 2014/0278824 A1* | 9/2014 | Kowalski | G06Q 10/00 705/7.38 |
| 2014/0279931 A1* | 9/2014 | Gupta | G06F 17/30575 707/683 |
| 2015/0234884 A1* | 8/2015 | Henriksen | G06F 17/30359 707/623 |

* cited by examiner

100

200

300

350

600

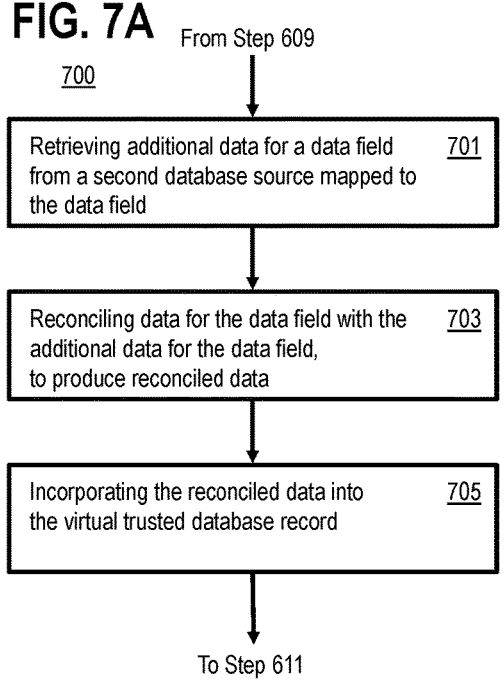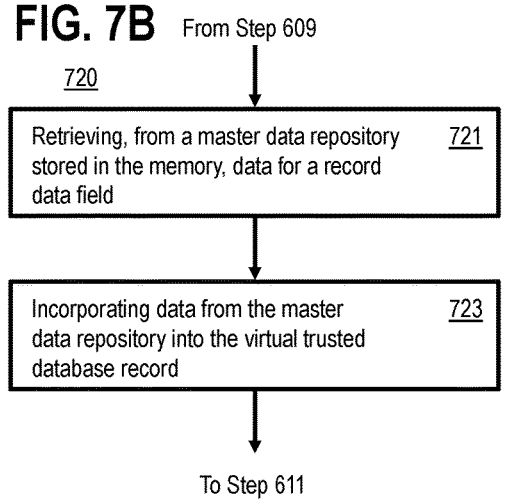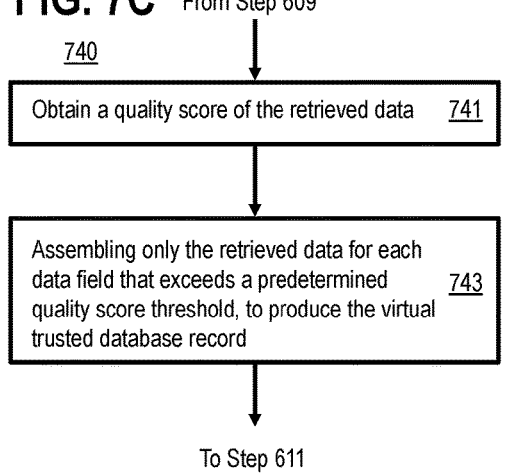

SYSTEM AND METHOD TO PRODUCE A VIRTUALLY TRUSTED DATABASE RECORD

CROSS-REFERENCE TO RELATED APPLICATIONS

This application claims the benefit of U.S. Provisional Patent Application Ser. No. 62/260,912, filed on Nov. 30, 2015, the entire content of which is hereby incorporated by reference in its entirety.

BACKGROUND

Field

Embodiments of the present disclosure generally relate to distributed databases, and, in particular, to a system and method for creation of a golden record from a distributed database.

Description of Related Art

In the art of databases, a Master Data Management (MDM) system can act as a remote but authoritative source of information (i.e., master data) for an entity that may not have a local or intrinsically authoritative source of information. The MDM may acts as a hub to service multiple systems, some of which in turn may be an authoritative source of information for different aspects of information for an entity.

Whether a source is intrinsic may depend on what information is supplied (e.g., whether the information is core to the organization maintaining the information), and to whom the information is supplied. For example, an intrinsically authoritative source of information may be a State motor vehicles agency (MVA) database, when supplying motor vehicle registration information to a non-MVA requestor. On the other hand, the MVA database may not be an intrinsically authoritative source of information for information not related to driving records or vehicles (e.g., if supplying "motor voter" registration information, or organ donor information). Furthermore, if the MVA has several internal databases, some internal databases but not others may be authoritative for internal-MVA usage.

For another example of authority, a customer relations management (CRM) system may be an authoritative source of information for most aspects regarding a customer, and the CRM system would be maintained and updated by a call center operator. However, a customer may also update their address via a customer service web site, which may use a different back-end database than that of the CRM system. Such a situation may lead to a discrepancy in customer address information between the CRM system and the customer service web site. It can be assumed that the customer knows their own current and correct information, so for address information in this example, the database used for the customer service web site would be authoritative over the CRM database (subject to verification or authentication to prevent spoofing, identity theft, etc.). More generally, a distributed database may have conflicting information if multiple copies of the information is stored in multiple geographic locations.

Known efforts in the background art to address the problem of multiple conflicting data in a distributed database have attempted to provide a mediation application at the MDM. The MDM mediation application would receives updates from multiple sources, act as a broker to determine which updates are to be regarded as authoritative (i.e., a "master record") and then provide this updated data to all subscribing systems. A master record may also be referred to as a golden record if the record contains data believed to be substantially the best and most complete data available.

The golden record is a single, authoritative version of data records in an organization. Authoritativeness may be established by the identity of the source, the identity of the information, the amount of cross-checking or cross-verification of the information across separate systems or databases, or a combination of the foregoing. Cross-checking and cross-verification would include consulting separate and independent data sources to check whether they list consistent information. In this context, the golden record is sometimes called the "single version of the truth," where "truth" is understood to mean the reference to which data users can turn when they want to ensure that they have the correct version of a piece of information.

The golden record encompasses all the data in every system of record (SOR) within a particular organization. A well-maintained, current golden record is often a fundamental element of the Master Data Management (MDM) policy for an enterprise. Organizations that manage master data typically expend a very large amount of time and resources attempting to explicitly create and maintain the definitive information in the golden record.

However, a "single version of truth" is often difficult to implement because many organizations have multiple information systems, each of which needs access to data relating to the same entities (e.g., customer). Often these systems are purchased "off-the-shelf" from vendors and cannot be modified in non-trivial ways. Each of these various systems therefore needs to store its own version of common data or entities, and therefore each system must retain its own copy of a record, which goes against the "single version of truth" goal. For example, an Enterprise Resource Planning (ERP) system may store a customer record, but the CRM system also needs a copy of at least a portion of the customer record, and the warehouse dispatch system may also need a copy of some or all of the customer data (e.g., shipping address). In cases where vendors do not support such modifications, it is not always possible to replace these records with pointers to the "single version of truth".

For organizations with more than one information system wishing to implement a "single version of truth", but without modifying all but one master system to store pointers to other systems for all entities, three supporting technologies are commonly used: Enterprise Service Bus (ESB), Master Data Management (MDM), and Data Warehouse (DW).

An Enterprise Service Bus (ESB) allows any number of systems in an organization to receive updates of data that has changed in another system. To implement a "single version of truth", a single source system of correct data for any entity must be identified. Changes to this entity (e.g., actions to create, update, or delete data) are then published via the ESB. Other systems that need to retain a copy of the data subscribe to this update, and update their own records accordingly. For any given entity, the master source should be identified (i.e., the golden record).

A system may publish information (i.e., be the source of the "single version of truth") for a particular entity (e.g., a customer), but also subscribe to updates from another system for information on some other entity (e.g., a product).

An alternative approach is to use point-to-point data updates, but these become exponentially more expensive to maintain as the number of systems increases, and this approach is increasingly out of favor as an IT architecture.

A Master Data Management (MDM) system can act as the source of truth for any given entity that might not necessarily have an alternative "single version of truth" in another system. Typically, the MDM acts as a hub for multiple systems, many of which could be the source of truth for updates to different aspects of information on a given entity. For example, the CRM system may be the "single version of truth" for most aspects of the customer, and may be updated by a call center operator. However, a customer may (for example) also update their address via a customer service web site, with a different back-end database from the CRM system. The MDM application receives updates from multiple sources, acts as a broker to determine which updates are to be regarded as authoritative (the Golden Record) and then syndicates this updated data to all subscribing systems. The MDM application normally requires an ESB to syndicate its data to multiple subscribing systems. Customer Data Integration (CDI), as a common application of Master Data Management, is sometimes abbreviated CDI-MDM.

Usage of a data warehouse (DW) is another technique of the known art. The primary purpose of a data warehouse is to support reporting and analysis of data that has been combined from multiple sources. However, because the data has been combined according to business logic embedded in the data transformation and integration processes, the data warehouse is often used as a de facto "single version of truth". Generally, data from the data warehouse is not used to update other systems. Instead, the DW becomes the "single version of truth" for reporting to multiple stakeholders.

The data management industry has not solved the problem of creating a reliable golden record without allocation of immense resources. The situation is further complicated because creation of a reliable golden record becomes more complex and difficult as more data source are introduced. Usage of a golden record does not truly acknowledge that the golden record is not a "one-size-fits-all" solution. So providing different golden records for different business contexts adds still more complexity to an already complex data situation. Thus the "golden record" becomes difficult and expensive to implement.

Therefore, a need exists to provide a simpler solution for providing trusted database records.

BRIEF SUMMARY

The Virtual Golden Record ('VGR') is automated and eliminates the need to create and maintain such a Golden Record, saving time and money, improving operational efficiency, while increasing data quality and meeting other requirements of the data (such as in transparency reporting). The Virtual Golden Record creation process utilizes a data retrieval mechanism, data analysis processes, and supplemental authoritative data to create the Golden Record in real-time. The Virtual Golden Record is an automated, highly-reliable snapshot in time of a Master Record's essential information needed to satisfy the requirement of the business context in which it was invoked.

Some embodiments may refer to "virtual" as meaning simulated or synthesized. For example, a virtual golden record may be a data record that has been synthesized from multiple sources. Other embodiments may refer to "virtual" in its meaning as "near" or "essentially" (e.g., "virtual certainty"), rather than it meaning as an electronic substitute for a real object (e.g., "virtual reality"). If a golden record is understood as being a trusted database record, some embodiments may recognize that different levels of trust for the data record may be adequate, depending upon the usage. Trust is used in the sense of being accurate or being temporally current, without a substantial lag time in reporting (relative to a rate at which the information might be expected to change), rather than the sense of "trust" as being not malicious.

Embodiments in accordance with the present disclosure provide a system and method to produce a virtual trusted database record, the method including receiving, by a processor coupled to a user-facing communication interface and to a memory, a request for the virtual trusted database record, the virtual trusted database record including a plurality of record data fields. Then identifying a business context of the request and assigning a respective priority to each of the record data fields, based upon the business context. Mapping each of the record data fields to a respective database source for data to populate the respective data field, the respective database source having a predetermined level of authoritativeness based upon the assigned priority. Retrieving data for each data field from the database source mapped to the respective data field, and assembling the retrieved data for each data field to produce the virtual trusted database record.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein:

FIGS. 7A-7C illustrates optional processes, in accordance with an embodiment of the present disclosure.

Figure 1:
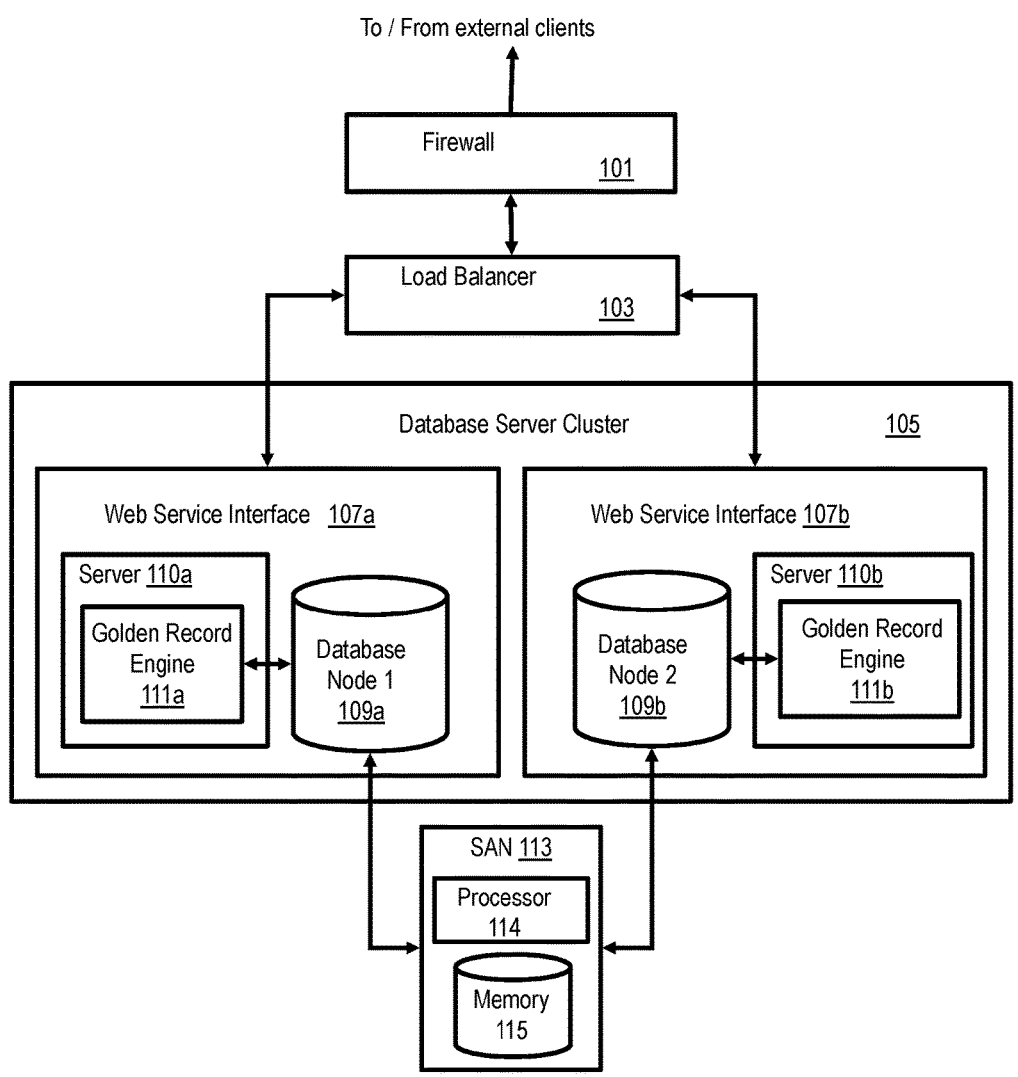
FIG. 1 is a block diagram depicting at a high level of abstraction a distributed database system in accordance with an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The exemplary systems and methods of this disclosure will be described in relation to software, modules, and associated hardware. However, to avoid unnecessarily obscuring the present disclosure, the following description omits well-known structures, components and devices that may be shown in block diagram form, are well known, or are otherwise summarized.

As used herein, the term "module" refers generally to a logical sequence or association of steps, processes or components. For example, a software module may comprise a set of associated instructions, routines or subroutines within a computer program. Alternatively, a module may comprise a substantially self-contained hardware device. A module may also comprise a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing computer code in a processor that performs the function; providing provisionable configuration parameters that control, limit, enable or disable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; energizing a circuit that performs the function (e.g., providing power to a transceiver circuit in order to receive data); and so forth.

As used herein, a data steward is an entity responsible for the management and fitness of data elements. Data stewards incorporate processes, policies, guidelines and responsibilities to administer an organizations' data in compliance with policy and/or regulatory obligations.

As used herein, "Open Payments" refers to a federally run program that collects information about certain financial relationships and makes the information available to the public. The certain financial relationships may include financial relationships between providers and medical device suppliers, e.g., between doctors (or hospitals) and medical device manufacturing companies. These relationships may include money for research activities, gifts, speaking fees, meals, or travel.

"Transparency" within the pharmaceutical and medical device manufacturing industries (collectively, drug and device suppliers) refers to disclosure of relationships between drug and device suppliers and healthcare professionals, such as relationships tracked by Open Payments. The goal is to provide to regulators and patients information that may be relevant to judging the impartiality of medical advice from the healthcare professionals (e.g., payment information), and provide an auditable trail of such payments. Various jurisdictions and regulatory bodies have differing transparency requirements, e.g., requirements that such reports have specific but different data report specifications.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes a computer readable signal medium such as a propagating signal. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

FIG. 1 illustrates at a high level of abstraction a system 100, in accordance with an embodiment of the disclosure. System 100 is deployed behind firewall 101. Firewall 101 provides a secure communication interface between system 100 and external client computers or systems that need to access system 100 (generically, "external clients"). Firewall 101 itself does not necessarily need to be incorporated within system 100, but instead may be incorporated into an external system that interfaces with system 100.

System 100 includes load balancer 103, which couples signals to/from external customers to database server cluster 105. Database server cluster 105 may be implemented as, e.g., a Microsoft™ SQL server (MSSQL). Load balancer 103 operates by intercepting data requests from external clients, and routing the data request to a database node within database server cluster 105 that best able to service the request. The routing may be performed, e.g., on the basis of which database node is currently operating under the lightest CPU processing load.

Database server cluster 105 includes a plurality of web service interfaces 107a, 107b (generically, web service interface 107). System 100 is not limited to the number of web service interfaces 107 depicted in FIG. 1. Web service interface 107 operates to provide an API interface for requests from external clients.

Web service interface 107 may be implemented as a server 110 associated with a database 109. More specifically, web service interface 107 includes a database node 109, which operates as a local database. Database node 109 communicates with, and is controlled by, the associated server 110. Server 110 includes a processor and memory, the memory storing program code as a set of programmed instructions that, when executed by the processor, perform the methods described herein. More specifically, the processor programmed with the instructions implements a golden record production engine 111.

Individual database nodes 109 may be further coupled to a storage area network (SAN) 113, which may reside at least in part outside of database service cluster 105. SAN 113 may further include a processor 114 and memory 115. Processor 114 may be used to manage SAN 113, including management of communications with database server cluster 105 and storing/retrieving data with memory 115. Database nodes 109 provide a query interface to SAN 113, and database nodes 109 process data returned from SAN 113.

System 100 supports Virtual Golden Record (VGR) processing. VGR is innovative and highly useful for many business contexts, including compliance, spend reporting and vendor on-boarding. Creation of a conventional Golden Record does not consider business context and instead seeks to create a single universal record. As a result, a conventional Golden Record sets up a maintaining organization for failure, because data is not static but rather often changes significantly over time. As soon as a labor-intensive data stewardship review and cleansing process is complete, a conventional Golden Record is correct and current only until the arrival of the next piece of data that touches the conventional Golden Record. In the healthcare field, data changes notoriously quickly. A Virtual Golden Record provides a compelling alternative to a never-ending quest for a perfect conventional Golden Record.

Virtual Golden Record replaces a conventional golden record, thereby eliminating costs associated with maintaining the golden record. A VGR production system uses data to create a business context-based, multilateral, multidimensional record that allows for the right VGR for the right purpose. The "right" VGR is relative to the purpose of the information, or how the information will be used. For example, a VGR including address information for a person may be "right" if it is based upon an authoritative CRM system. In other circumstances, the "right" address if for billing purposes may be a billing address supplied by an accounting system. A multilateral or multidimensional record may include multiple fields or instances of similar information so that a user of the VGR can select the best instance of the information based upon the context of usage (e.g., separate addresses for mail, billing, freight delivery, office visits, etc.). Similarly, a VGR including credit information will be "right" if it is based upon information provided by an authoritative credit rating agency. The VGR may include a plurality of record data fields to provide the individual items of information required by the business context, e.g., a name field, various credential fields, and so forth.

The VGR may be compiled in an automated fashion, in real-time, e.g., within about one second. The VGR also may be produced with higher reliability compared to a manual process of creating a golden record.

Figure 2:
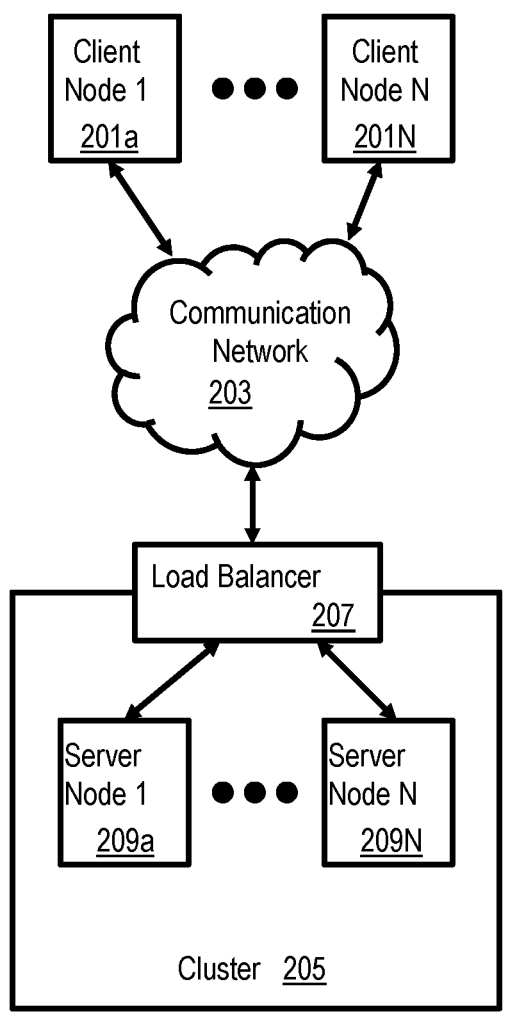
FIG. 2 is a block diagram depicting at a different level of abstraction a distributed database system in accordance with an embodiment of the present disclosure.

FIG. 2 illustrates at a different level of abstraction a system 200 in accordance with an embodiment of the present disclosure. System 200 illustrates a plurality of client nodes 201a . . . 201N that are communicatively coupled through communication network 203 to cluster 205. In at least some embodiments, cluster 205 may correspond to database service cluster 105 depicted in FIG. 1. Cluster 205 may include a plurality of server nodes 209a . . . 209N. In at least some embodiments, server node 209 may correspond to web service interface 107 depicted in FIG. 1. System 200 may further include load balancer 207, which operates to assign work requests from client modes 201 to an appropriate server node 209. In at least some embodiments, load balancer 207 may correspond to load balancer 103 depicted in FIG. 1.

The communication network 203 may be packet-switched and/or circuit-switched. An exemplary communication network 203 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 203 is a public network supporting the TCP/IP suite of protocols.

Figure 3A:
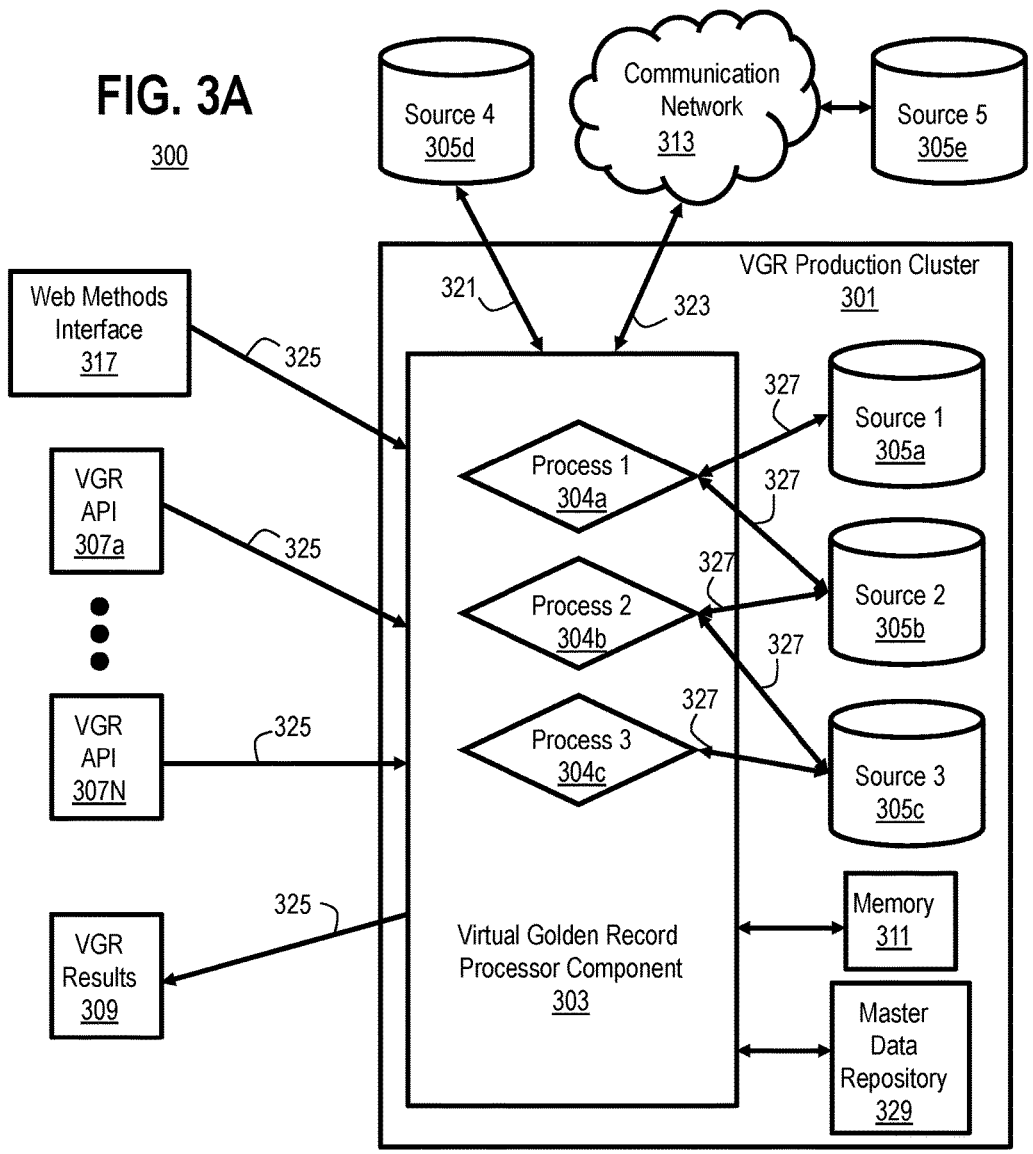
FIG. 3A illustrates usage of a system to create a VGR, in accordance with an embodiment of the present disclosure.
Figure 3B:
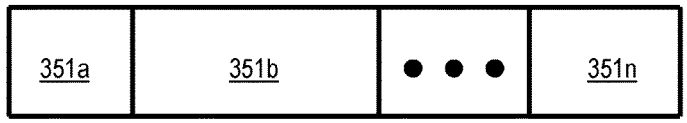
FIG. 3B illustrates an exemplary layout of a VGR.

FIGS. 3A and 3B illustrate usage of a VGR production system 300 to create a VGR. Usage of VGR production system 300 may begin when one of VGR APIs 307a . . . 307N are called by an external computing client or system, such as client node 201 of FIG. 2. The VGR API 307 transmits the request to a VGR production cluster 301, and in particular to a VGR processor component 303 within VGR production cluster 301. VGR processor component 303 may be coupled to a memory 311, which may include a volatile memory (e.g., RAM memory) and/or non-volatile memory (e.g., disk drive, flash drive, solid state drive, etc.) used to store data and sets of program instructions used by VGR processor component 303. VGR production cluster 301 may further include a database, which may be implemented as a plurality of individual databases sources 305a, 305b, 305c (generically, database source 305). Database source 305 may be implemented by physically dispersed memory storage.

VGR processor component 303 may include one or more computer-implemented processes 304a . . . 304c (generically, processes 304), which may operate to receive client requests through VGR API 307, interpret the request into database access language (e.g., SQL) and query database sources 305. Processes 304 may also query a database source 304d external to VGR production cluster 301. Processes 304 in turn will receive query results back from the individual database sources 304, compile them into a VGR, and produce VGR results 309. VGR results 309 in turn are then returned to the calling external computing client or system. Processes 304 may be implemented by computer code stored in a nonvolatile memory (not illustrated), which when executed by VGR processor component 303 performs the steps of processes 304. Each of processes 304 may in turn comprise one or more sub-processes (not illustrated in FIG. 3).

In some embodiments, processes 304 may determine which of database sources 305 to query based upon information supplied in the client request. For example, the information may indicate a business context (e.g., a company finance context, a billing context, a medical context, etc.) or a preference for a particular database (e.g., Edgar for financial information about public companies), or a database maintained by a particular data steward (e.g., databases maintained by the Department of Health and Human Services), or a database from a particular industry (e.g., the hospital industry), and so forth. In some embodiments, the information may indicate disfavored database sources 305 rather than preferred database sources 305.

In other embodiments, processes 304 may infer business context and/or which of database sources 305 to query based upon a characteristic of the client request. For example, the inference may be based upon geo-location information inferred from an IP address, in order to give preference to databases near to, or in the same governmental jurisdiction as the client. Or, for example, the inference may be based upon the type of information being sought (e.g., if a zip code is being sought, then a U.S. Postal Service database is a preferred source). Or, for example, the inference may be based upon an identification of the requestor (e.g., inferring an accounting business context from a request by an accounting group, and thus preferably will refer to an authoritative database in the accounting industry for accounting-related information). In some embodiments, the inference may indicate disfavored database sources 305 rather than preferred database sources 305. In some embodiments, after process 304 infers information about the client request, process 304 may query a whitelist or blacklist of database sources 305 that are preferred or not preferred, respectively, for providing the particular kind of information that is sought, in light of the inferred information.

In other embodiments, a description may be associated with each of database sources 305. For example, the description may include a set of descriptors such as the contents, the coverage, the source of the stored data, any restrictions on usage, the owner, the geographic location, etc. Processes 304 may perform a match to this information in order to select the preferred (or disfavored) database sources 305. The match may be performed in several ways, e.g., a semantic match of the client request to the database description, or an exact match of the client request to one or more descriptors of the database, or a closest match to one or more descriptors of the database, and so forth.

Embodiments in accordance with the present disclosure are useful to produce a Virtual Golden Record, applicable to produce reports as mandated by the Affordable Care Act (ACA) and enforced by Centers for Medicare & Medicaid Services (CMS) through their Open Payments system. Companies must generate reports that are compliant with highly-specific data-element level requirements mandated by CMS's Open Payments system, including providing exactly the requested information about covered recipients (e.g., U.S. physicians and teaching hospitals), without which the records would be rejected by the Open Payments system.

The embodiments of FIG. 2 and FIGS. 3A-3B are useful for the process of producing a VGR. This process includes retrieving, by process 304 in a suitably-programmed VGR processor component 303, authoritative data (e.g., National Plan and Provider Enumeration System ("NPPES"), the CMS-mandated Validated Physician List, etc.) from an external authoritative source such as a CMS-maintained database, represented by external database sources 305d, 305e of FIG. 3A at least some of which are accessed through communication network 313. The data-level requirements are subject to change, and have changed every year since they were established. Communication links 321 and 323 couple VGR processor component 303 with external database sources 305d, 305e, respectively, so that any of processes 304 can access external database sources 305d, 305e. Communication links 327 couple VGR processor component 303 with internal database sources 305a . . . 305c. Communication links 321, 323 and 327 may be referred to as database-facing communication interfaces.

The communication network 313 may be packet-switched and/or circuit-switched. An exemplary communication network 313 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 313 is a public network supporting the TCP/IP suite of protocols.

One or more of process 304 may provide a VGR production process as part of a SpendTracker process. The SpendTracker process, represented by one of processes 304 and as performed by a suitably-programmed VGR processor component 303, is able to request a client's master record from one of database sources 305. Assuming there is a strong enough match to the mandated data sets (e.g., as judged by the presence of data fields storing information required by CMS), the SpendTracker process can automatically generate a compliant and complete CMS report. In this case, generation of the report by the SpendTracker process may be accomplished without requiring a manual review, or an enrichment of the report (i.e., an augmentation) by use of data from a non-authoritative source (e.g., a different external database source 305d, 305e), or other manipulation of the client's master record.

FIG. 3B illustrates an exemplary layout of a VGR 350. VGR 350 may include a plurality of record data fields 351a . . . 351n. Each of record data fields 351 contains a piece of requested information, e.g., a name, a license number, a dollar amount, etc. The sizes of record data fields 351 may be unequal. The size and quantity of record data fields 351 will depend upon what data was requested, e.g., depending upon the business context of the request.

A Virtual Golden Record helps solve a wide range of transparency and reporting requirements that may be similar or comparable over multiple jurisdictions. In addition, a system in accordance with an embodiment of the present disclosure enables different organizational units or functional areas within a company to create their own customized definition of golden records that satisfy their own business contexts. For example, with respect to system 300, a company may have a single VGR production cluster 301. However, various entities within the company (e.g., marketing, accounting, research, etc.) may have or operate separate processes 304, which they may access through separate VGR API interfaces 307, in order to create their own customized definition of golden records that satisfy their own business contexts. System 300 used to implement VGR may provide the customized golden data to each data consumer.

In some embodiments, jurisdictional-specific reports may be implemented by storing in memory (e.g., in memory 311) specific reporting requirements or templates for each jurisdiction of interest. Such requirements or templates are used by a process 304 to guide data retrieval and formatting when preparing a VGR. A desired jurisdiction may be selected by a user or external system through VGR API 307 and/or web methods interface 317. VGR API 307 and web methods interface 317 may be coupled to VGR processor component 303 by use of communication links 325. Communication links 325 may be referred to as a user-facing communication interface.

Another business context for various system embodiments is the use by a global compliance department for performing due diligence in the evaluation of vendors or distributors. Specifically, one of processes 304 of VGR production cluster 301 can be configured to access outside database sources 305e through communication link 321 and communication network 313 to retrieve one of numerous public and fee-based sanctions lists in order to check records of a prospective vendor or distributor for reliable matching data as a step of a due diligence process by a large vendor. Such a VGR matching process 304 typically uses geo-location of each physical address, approximate string matching, and other advanced processes for fuzzy but highly reliable automated matching. These advanced processes may be implemented by other processes 304 running by a suitably-programmed VGR processor component 303. A set of program instructions to carry out processes 304 may be stored in memory 311. These are just a few on the many business and government compliance applications of Virtual Golden Record.

Important attributes of VGR applications include:

1. Internal data storage 305a . . . 305c that include capturing and tracking the Source and Sub-source of each component of data. A Sub-source may refer to a smaller organization within the organization of the Source. For example, if the Source is a large pharmaceutical company, Sub-sources may include one or more of a sales group, a marketing group, a clinical trial management group, etc. of the large pharmaceutical company. A second large pharmaceutical company may have their own, separate set of Sub-sources. In some embodiments, the Source or Sub-source may be further associated with information indicating a business context that the Source or Sub-source is authoritative.

2. Internal data storage 305a . . . 305c that include capturing and tracking active and expiration dates of each component of data. Data may have an expiration date if, e.g., it may be expected to change occasionally or be subject to an inherent time limit. For example, professional licenses may be subject to yearly re-registration requirements, or prescription information may expire after one year, or provider contact information may be subject to re-verification every five years, and so forth.

3. A process to incorporate disparate data sources (e.g., flat list data as well as master data) into the VGR. Flat list data may include a tabular, non-hierarchical representation of data. The ability may be provided by suitable sets of program instructions executing on VGR processor component 303.

4. A process to generate and deliver the VGR in real-time via APIs 307 or web methods 317.

5. A process to apply matching rules and processes, as well as the distinct data sets or data sources for each VGR business context application. The process may be provided by suitable sets of program instructions executing on VGR processor component 303 as a process 304. The matching rules and processes may be defined by a user at client node 201, or an automated external system, who access system 300 through VGR API 307 or web methods 317. For example, data from different Sub-sources within a Source may be formatted differently. Dates may be formatted as dd.mm.yyyy, dd.mm.yy, mm.dd.yyyy (e.g., from European sources), yyyy.mm.dd, and so forth. Names may be with or without a middle initial or suffix (e.g., Jr., III, PhD., etc.). Account numbers may include or exclude leading zeros, or have a differing number of leading zeros. SSNs may include or exclude dashes. Telephone number may be formatted differently (e.g., (xxx) yyy-zzzz, or xxx-yyy-zzzz, or xxx.yyy.zzzz, etc.). Alternatively, at least some of the matching rules and processes may be derived by system 300 through inference, e.g., if one textual field ignores fill characters, a similar textual field may also ignore fill characters. Matching rules and processes can recognize and resolve matching data despite relatively minor textual differences.

6. A process to accept additional parameters for real-time generation of VGR, in order to accommodate specific data consumer requirements (e.g., identifier normalization schemes). The additional parameters may be defined by a user at client node 201, or an automated external system, who access system 300 through VGR API 307 or web methods 317. Such additional parameters may be stored in memory 311, and accessed and used by suitable sets of program instructions executing on VGR processor component 303 as a process 304.

7. A process to accept, from the consuming system receiving the VGR, a definition of business rules for the utilization of the data, e.g., the reporting rules for CMS reports. For example, a reporting rule may be: to report all expenses for calendar year 2015, paid to physicians, over $10 for each singular expense or over $100 in aggregate, for expense types consisting of meals, travel, lodging, consulting.

A VGR production system 300 solves a problem of an expensive-to-create, or non-attainable, golden record by first determining a business context for golden record. The business context may describe a broad description of the purpose for requesting the data (e.g., to produce an accounting report, or a SpendTracker report, etc.). In other embodiments, the business context may describe a more narrow or specific usage of the data. For example, the business context may involve obtaining a customer's addresses (e.g., billing or shipping addresses, or past addresses) from one of internal or external database sources 305, or may involve estimating a customer's credit worthiness. In contrast, typical golden record approaches of the known art do not consider the context of usage, but instead are focused on producing a single VGR that is used for all contexts (i.e., the "one truth").

The present embodiments recognize that VGR is not necessarily a one-size-fits-all data product, but instead may be tailored to exact specifications required by each customer (e.g., format and content of the VGR, preferred sources, etc.), and outcomes sought by the customer, e.g., a desired level of error checking, consistency checking, cross-verification, and so forth. The tailoring may be controlled by an end user at one of client nodes 201, and accessing VGR production cluster 301 through VGR API nodes 307 or web methods 317.

In the present embodiments, a VGR produced by VGR production cluster 301 is substantially always defined and bounded by its business context. The business context may set or determine a priority of fields or data, e.g., which requested fields of information are more important. For example, when preparing a transparency report, identification of the drugs or devices involved may be more important that patient address information, therefore the drug and device information may be provided by VGR production cluster 301 with a higher level of assurance than patient address information.

VGR production system 300 may execute a process 304 that examine a wide variety of data from internal and external database sources 305a . . . 305e that can help provide golden data, whether the data is in a master data repository 329 or is external to the master data repository 329. Process 304 evaluates the data components (e.g., data fields) to determine which data components are the best, or most appropriate, for the context of usage. For example, context of usage may be specified in a request for data, or may be inferred from an identity of the requestor (e.g., name, title, IP address, etc.). Such processes 304 may be implemented by sets of programmed instructions stored in memory 311 that, when executed by VGR processor component 303, will perform such processes 304. In contrast, a conventional golden record creation process utilizes only the data in the master data repository 329.

VGR production system 300 may execute a process 304 to distinguish the source and sub-source of substantially every data element or component record in master data repository 329, as well as external data that may be utilized. Rules for creating the VGR rely on a data source for its determination and definition Attributes and properties of a data source influence and/or determine the rules used in creation of a VGR involving the data source, because it is the attributes and properties of the data source that determine relevancy to the intended usage of the data. The user is merely a consumer of data, but it is the nature of the data source that determines relevancy regarding how the data will be used used in a VGR. Such processes 304 may be implemented by sets of programmed instructions stored in memory 311 that, when executed by VGR processor component 303, will perform such processes 304. In contrast, most master data repositories do not capture or track the data source along with each component of data itself.

VGR production system 300 may include a process 304 that uses creation logic, matching rules and thresholds of the quality of match (e.g., a score or minimum number of matching elements) that are based upon analyzed strengths, weaknesses and overall quality of the data sources, as well as the requirements of the output. Quality of data sources may be indicated by, e.g., whether the data is vetted or cross-checked for accuracy (i.e., high quality), or whether the data is self-reported data that allows free text input, nonqualified by an independent review (i.e., low quality). Such processes 304 may be implemented by sets of programmed instructions stored in memory 311 that, when executed by VGR processor component 303, will perform such processes 304. In contrast, most master data repositories do not function in this manner.

VGR production system 300 may run in real-time, and executes processes 304 that use the latest information from substantially every source utilized. The VGR application then creates the Virtual Golden Record in real-time by analyzing the existing record, related records in the master data repository 329, and combining it with additional data from authoritative sources that are relevant based on the business context. Techniques to determine relevancy may include keyword matching of a description of the business context to a description of the authoritative sources, or a semantic comparison of the same, or reliance upon a coding or classification scheme, etc.

The results of the VGR production system can be stored as one or more snapshots (e.g., intermediate results) in order to create an auditable trail. For example, a snapshot may describe or document the sources of various data used to create the VGR. Such processes 304 may be implemented by sets of programmed instructions stored in memory 311 that, when executed by VGR processor component 303, will perform such processes 304. In contrast, while many master data repositories may support real-time access to data, no MDRs of the known art function as described for VGRs.

A VGR production system solves a problem of an expensive or non-attainable golden record by first finding out from the data consumer (e.g., by asking, inference, consumer specification, etc.) questions such as:

What is the business context of the golden record you are seeking? Why do you need it and how will you use it?

What data components are you seeking (e.g., best address, correct taxpayer ID number (TIN), specific types of affiliations, location within a predetermined radius (e.g., 5 miles) of a specified location, fair market value (FMV) range, etc.)?

Will all data in the master data repository 329 be utilized, or only data from particular data sources/sub-sources/users? This assumes the master data repository 329 contains data from multiple sources and can differentiate the source/sub-source of its various master and component records. (e.g., addresses from sales force, call notes from a particular medical science liaison (MSL), investigator data provided by a particular contract research organization (CRO), etc.).

What existing external or supplemental data sources contain information that can assist in construction of a VGR (e.g., FDA sanctions list; list of Hospital Y employees, France RPPS-licensed physicians, U.S. Physicians considered key opinion leaders (KOLs) in Interventional Cardiology, list of foreign government officials, etc.)?

Whether there are any internal data sources, external to master data repository 329, that the data consumer is able to access and which can be utilize. Is an additional fee required for data access? Do the terms of usage of any data source prevent or prohibit its usage when creating a VGR?

How specifically will the data be consumed, e.g., specific formatting and content requirements? A process 304 may determine what specific data or quality requirements the VGR must meet (e.g., whether spend transparency reports should be sent to CMS, consideration of other jurisdictional report with a specific unique identifier requirements, providing output into a summary for vendor due diligence risk assessment, providing bulletized discussion topics loaded into a mobile device for an upcoming sales call, etc.). Such processes 304 may be implemented by sets of programmed instructions stored in memory 311 that, when executed by VGR processor component 303, will perform such processes 304.

After analysis of the above, determine any specific matching rules and/or processes and/or thresholds to optimize a figurative "signal to noise" and quality of output, in order for the VGR to meet the usage requirements of the data consumer or ultimate consumer. For example, a database source 305 may have an associated quality score that quantifies some aspect of database source 305. Aspects may include, e.g., coverage, amount of data verification performed, reputation of the data steward, etc. The figurative "signal to noise" and quality of output then may be calculated as a sum of the quality score for the data in each field of the VGR, weighted by the importance of the respective field in light of the business context.

Once these questions are answered, the VGR process may be implemented by a suitably-programmed processor executing sets of instructions stored in a tangible, non-volatile computer memory.

VGR production system results may be accessed via one or more client web services. In one embodiment, VGR web services may in turn invoke a data-agnostic customer master data repository 329. The master data repository 329 may store or remotely access data utilized by the VGR production system, may receive a master record that had been requested by the VGR production system, may perform real-time analysis of the master record and the data sets available to the VGR production system, and may return the Virtual Golden Record in a conventional format (e.g., XML). The client system that called the VGR web services would then take the returned VGR data and store and process it according to the business context it is seeking to satisfy.

In some embodiments in accordance with the present disclosure, a process to create a VGR may include an enhanced name-matching analysis process 304. For example, the name matching may include searching for names that are phonetically similar (e.g., "John" and "Jon"), names that may be a nickname (e.g., "Bill" or "Will" for "William", etc.), recognizing the presence of absence of initials (e.g., a middle initial, or a first name initial), and so forth. The enhanced name-matching analysis process 304 may include usage of a table of equivalent names (e.g., "Bill" or "Will" would map to "William", "Dick" and "Rick" would map to "Richard", etc.), or translation to a phonetic representation for comparison (e.g., "John" and "Jon" would map to the same phonetic representation), treating some fields such as a middle initial or suffix as optional or not dispositive, or a combination of such techniques. Memory 311 may store a table of equivalent names, and/or sets of programmed instructions that when executed by VGR processor component 303 will carry out the enhanced name-matching analysis process 304.

Some embodiments may include a process 304 to flag data "enhancement" and remediation opportunities for data stored in an external MDM system accessed during the VGR creation. For example, if some data fails to follow a convention followed by other data (e.g., if one system includes addresses having "Street" abbreviated as "St." but another abbreviates it as "ST"), then a remediation opportunity may be identified. Memory 311 may store a table of equivalent data, and/or sets of programmed instructions that when executed by VGR processor component 303 will carry out the process 304 to identify remediation opportunities and/or remediate the data.

Some embodiments in accordance with the present disclosure may include a process to generate transparency reports for other U.S. jurisdictions, utilizing enhanced data, in order to provide improved accuracy, e.g., a Massachusetts-mandated aggregate spend report. Enhanced data would be data that is supplemented with related data from other sources.

Some embodiments may include a process to generate transparency reports for non-U.S. jurisdictions with enhanced data utilization and accuracy.

Embodiments in accordance with the present disclosure may enhance existing data products, offerings and analysis tools, as described below.

For example, there are a wide range of potential uses of a VGR production system across systems for various purposes, such as for the production of aggregated financial reports. This may involve utilizing VGR via web services, coupled with a consuming system that has been set up to consume (e.g., interpret and analyze) the VGR data appropriately.

In another example, a VGR production system may be integrated or utilized from within an external computing system or clients. This capability may include provisioning or pre-configuration in order to customize a client's system to utilize VGR.

In another example, a VGR production system may provide a basis for a data enhancement solution, such that the VGR production system automatically identifies possible duplicate records using relatively complex proximity and matching processes and metrics.

In another example, a VGR production system may be configured as a standalone database system to be used by clients. The clients either may purchase and use the VGR system, or may contract with a third party for data stewardship or matching services. In the latter case, the third party is the purchaser of the VGR system. A standalone database system may provide a solution that is faster and more reliable than that which could be obtained with traditional service agents. VGR as a tool for data stewards may provide faster and/or more accurate matching and merging decisions In another example, VGR may provide a wrap-around technology for external and/or proprietary data (e.g., IMS OneKey/Health Care Relational Services (HCRS) data). The wrap-around technology provides a query interface to the data, without allowing access to the underlying raw data. Some clients may encounter complex data-focused business challenges in a wide range of fields or applications. For such clients, consultants or solution providers can solve client problems by providing a VGR solution that utilizes specific external and/or proprietary data assets. This also may result in a new customer set or sales channel for selling access to the external and/or proprietary data. Such a capability may be useful and effective for financial transparency reporting.

As the capabilities of VGR become better known within an organization, it may be expected that other organizational users would recognize the usefulness, and develop new uses for VGR.

A master data repository 329 used to support VGR functionality may track the source and/or sub-source of data stored within it, such as by use of an extra database field to indicate the source of a data record. The master data repository 329 also may determine and store location-based data using geo-coordinates. In some embodiments, the geo-coordinates may include latitude and longitude data. In other embodiments, the geo-coordinates may include governmental jurisdiction information (e.g., city, state, and/or country information).

Figure 4:
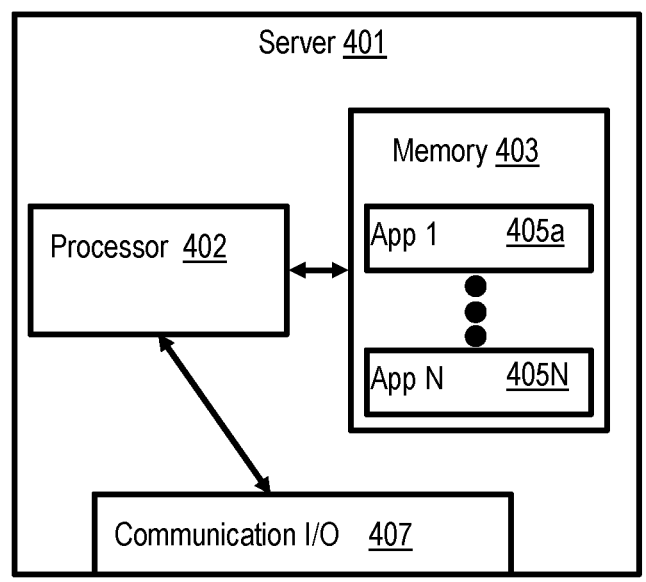
FIG. 4 illustrates internal components of a server, in accordance with an embodiment of the present disclosure.

FIG. 4 illustrates internal components of a server 401, in accordance with an embodiment of the present disclosure. Server 401 may include a processor 402 coupled to a memory 403. Memory 403 may be configured to store one or more application programs 405a . . . 405N, which may be used to implement certain processes such as processes 304. Server 401 may further include communication I/O 407, which may include a transceiver coupled to processor 402. Communication I/O 407 allows server 401 to communicate with other devices and components external to server 401.

Use Case

When an expense record is itemized, embodiments trigger a sophisticated search and retrieval process to obtain the latest information about the beneficiary of the expense. Specifically, the information found and returned to the itemized record includes:

The refreshed Master Record—the latest information from a VGR production cloud-based master record about the recipient, because the master record may have been updated in the VGR production system after the expense or attendee record was added to the system.

The Virtual Golden Record—which includes information from all other authoritative records in the VGR production system with a definitive match to the recipient Master Record.

CMS Validated Physicians List match—if the Master Record has a National Provider Identifier (NPI) number, the Virtual Golden Record creation process will also check for a match in the latest CMS Validated Physicians List and return the State License Number (SLN) for the recipient that has been validated by CMS.

The information returned as the Virtual Golden Record (VGR) then may include information such as:

Names found in the Master Record and the VGR, including the Source, the Type, and whether it is Primary.

Addresses—all Addresses found in the Master Record and the VGR, including the Source, the Type, and whether it is Primary.

Identifiers—NPI, State License Number, Teaching Hospital ID number (THID) (if Teaching Hospital) or Taxpayer ID Number (TIN), Taxonomy codes, Specialties, Company-specific IDs (the list is configurable for each company)—all with Source, the Type, Active and Expiration dates when known, and whether it is Primary.

This includes SLNs from the CMS Validated Physicians List, if the Master Record or Virtual Golden Record has a matching NPI.

Record Types & Subtypes—All Record Types and Subtypes found in the VGR are added to the corresponding VGR fields on the Itemized Expense, including adding "Physician" to the VGR Record Type.

These values are commonly used in Recipient Inclusion Criteria for Reporting Rules. Recipient inclusion criteria are used to select physicians who must be reported upon, e.g., physicians with a Vermont SLN, so supplementing this information with VGR data can be extremely valuable. For example, a physician misclassified as non-physician in NPPES will still be assigned a VGR Record Type of 'Physician' if they are matched in the CMS Validated Physicians list.

Affiliations—all Affiliations found in the Master Record (only utilized in France Sunshine Reporting).

Each company system can be configured to disable usage of Virtual Golden Record. In this case, the information returned would just be the information from the Master Record. Companies whose systems are set this way are relying on the quality of their master data repositories to meet all their reporting needs.

The system then determines what records comprise the Virtual Golden Record. Considerations may include terms of standard licensed data sets available for all companies using, SpendTracker and how each may be utilized in the generating the Virtual Golden Record. For each data source, this may include consideration of whether the data source is authoritative, identifiers in the source data, and in which steps of a process a particular data source may be used. Note that a company system might have several Client Data Sources, such as extracts from an externally-maintained customer master owned by the company, or premium data, or data manually added by system users.

Figure 5:
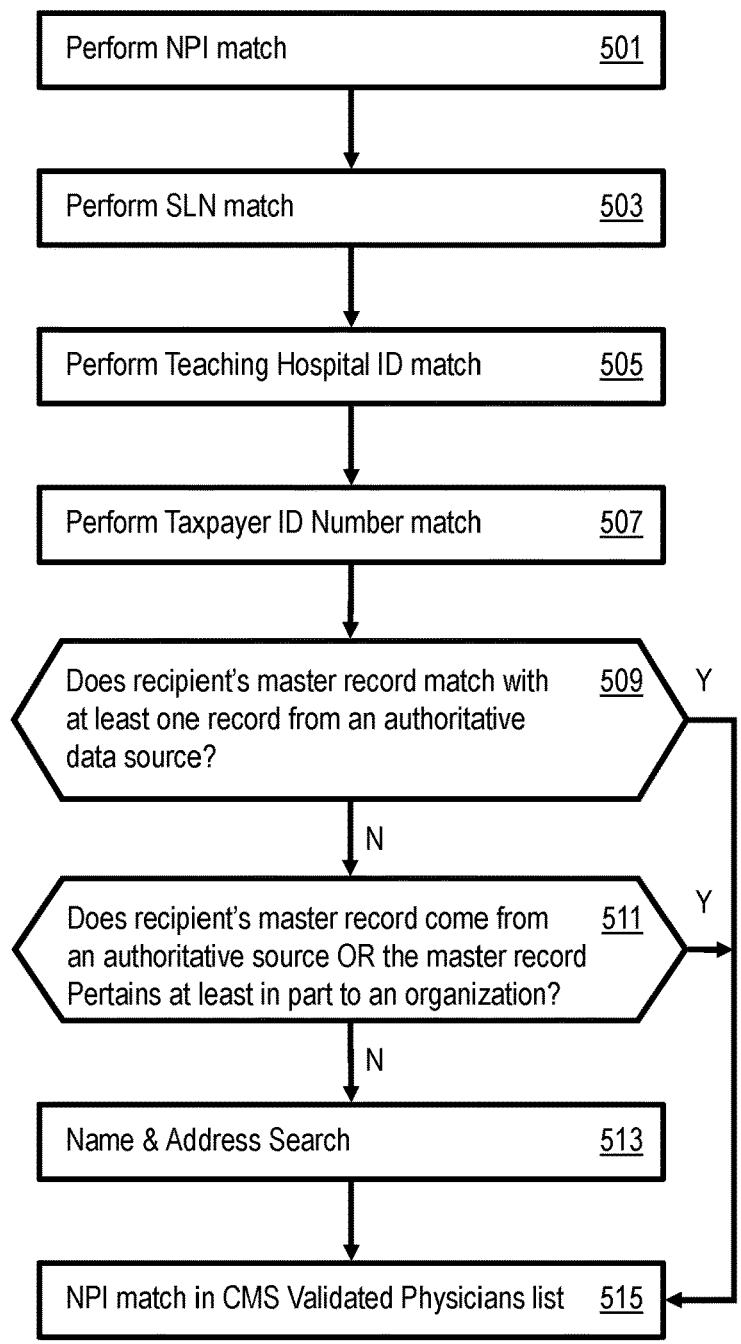
FIG. 5 illustrates a process, in accordance with an embodiment of the present disclosure.

Steps that embodiments may use to generate the Virtual Golden Record are illustrated in process 500 of FIG. 5. These steps may be performed by VGR processor component 303. Process 500 may include:

Step 501. Perform an NPI match, to match master record data with data from an official source of NPI and/or NPPES data. This may require an exact match on NPI and Last Name on all the company's licensed data that may have an NPI number (includes NPPES, State Databases, and so forth).

Step 503. Perform an SLN match. This may require exact match SLN and State and Last Name on all the company's licensed data that may have SLNs. The VGR generation process should not get stymied by special characters commonly found in State License data. The SLN match may remove formatting or fill characters (e.g., dashes, dots, leading zeros, etc.) before attempting to match.

Step 505. Perform a Teaching Hospital ID match, which may require an exact match on THID (not just checking for match on Name). Note that the old CMS Teaching Hospital (TH) list and new CMS TH list may have distinct non-overlapping THIDs, so THs added from old list or record that used legacy data or processes may have the old format THID; and the THs added from the new list or are 2014 expenses remediated to use new TH list will have the new format THIDs.

Step 507. Perform a TIN match. All records from the current Teaching Hospital list with exact match on TIN and Name.

Step 509. If the Recipient's master record has matched with at least one record in an authoritative data source, then skip Step 513 (Name and Address search) and go to Step 515. Otherwise, if the result of step 509 is negative, proceed to step 511. VGR processor component 303 know about the Recipient's master record because the recipient's master record is explicitly submitted to the VGR processor component 303 for evaluation.

Step 511. If the Recipient's master record has no match (i.e., the result of step 509 was negative) but the Recipient's master record came from an authoritative source, then skip Step 513 (Name and Address search) and go to Step 515. If otherwise, and if the master record (and the VGR) pertains only to individuals (i.e., not to organizations), continue to Step 513. Whether the master record pertains to an individual or an organization may affect what technique is used to perform the matching.

Step 513. Name/Address search: First Name, Last Name, Address, City, State, Zip exact match in a VGR production system search.

Step 515. NPI match in CMS Validated Physicians list: all records with exact match on NPI—this will pull in SLNs and Name.

A VGR then may be constructed for CMS Reports, using the foregoing information, as indicated by Table 1, below.

TABLE 1

| Report Type | Source of Physician NPI with precedence | Source of Physician SLNs with precedence | Physician Specialty |
| --- | --- | --- | --- |
| CMS General Payments | NPPES, then Premium Data, then other Sources | CMS Physicians List, then NPPES, then Premium Data, then other sources | NPPES, then Premium Data, then other sources |
| CMS Research Payments | NPPES, then Premium Data, then other sources | CMS Physicians List, then NPPES, then Premium Data, then other sources | NPPES, then Premium Data, then other sources |

Precedence in Table 1 refers to a sorted listing (on a cell-by-cell basis) of sources of information for inclusion in the VGR, when more than one source of information may be available.

For determining if a person (e.g., a Recipient or Principal Investigator) is a Physician, and thus should be included in the report, the person will be considered a Physician if the Master Record or any matching VGR record has a Record Type=Physician. Embodiments may automatically cope with a situation in which certain misclassified records are reportable, but due to self-reported taxonomy data in NPPES, the Physician had been classified with a non-Physician taxonomy code.

If a client wants to view the Virtual Golden Record in its entirety, at least two methods may be provided by a user interface. Method 1: Search for and select the Individual or Organization record, and then go to its Virtual Golden Record tab. Method 2: From an itemized expense, a link may be provided to show VGR Matches, e.g., "View the records that comprise the Virtual Golden Record".

Every time a client views the Virtual Golden Record user-interface tab for an Individual or Organization record, embodiments may execute a process 304 that refreshes the tab with the latest information, which may take several seconds. If any data changes or new data was added, it will be included if the data matches. Such processes 304 may be implemented by sets of programmed instructions stored in memory 311 that, when executed by VGR processor component 303, will perform such processes 304.

Figure 6:
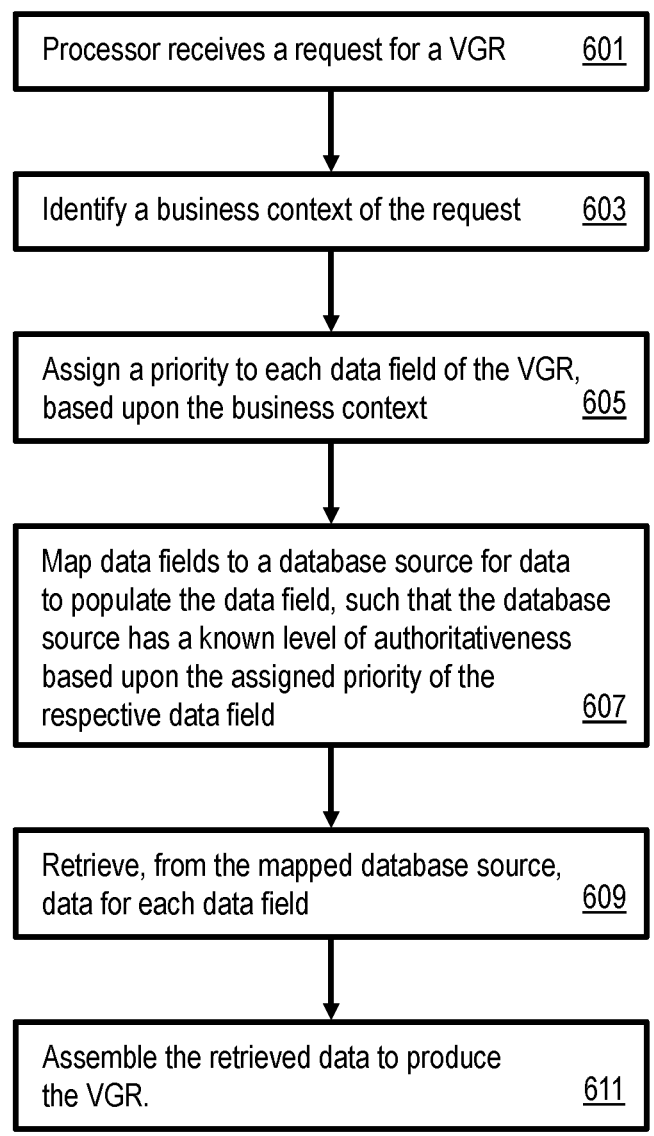
FIG. 6 illustrates another process, in accordance with an embodiment of the present disclosure.

FIG. 6 illustrates a process 600 to produce a virtual trusted database record, in accordance with an embodiment of the present disclosure. Process 600 begins at step 601, at which a processor 303 coupled to user-facing communication interface 325 and to a memory 311, receives a request for the virtual trusted database record (i.e., a VGR), the virtual trusted database record including a plurality of record data fields.

Next, process 600 transitions to step 603, at which a business context of the request may be identified. For example, the business context may be included within the request for the virtual trusted database record. In some embodiments, the business context may be inferred from a characteristic of a requestor of the request (e.g., an identity of the requestor, affiliation of the requestor, etc.). In some embodiments, the business context includes an identification of an intended usage of the virtual trusted database record (e.g., to produce a SpendTracker report, etc.). In some embodiments, the business context includes an identification of a format for the virtual trusted database record (e.g., a user-identified format, etc.). In some embodiments, the business context includes an identification of a source of data to include in the virtual trusted database record (e.g., sources on a whitelist, etc.). In some embodiments, the business context includes geo-location information of a requestor of the request (e.g., latitude, longitude, being within an identified governmental jurisdiction, etc.).

Next, process 600 transitions to step 605, at which VGR processor component 303 may assign a respective priority to each of the record data fields, based upon the business context. For example, if the business context is to assess a credit score, and if the virtual trusted database record includes separate record data fields for income and vehicle information, embodiments may assign higher priority to the income field compared to the vehicle information field. However, if the business context is to support underwriting of an automobile insurance policy, embodiments may assign higher priority to the vehicle information field compared to the income field. Priority information may be assigned qualitatively (e.g., "high", "medium", "low", etc.) or quantitatively (e.g., on a scale of 1 to 5, a percentage scale, a numeric weighting, etc.).

Next, process 600 transitions to step 607, at which VGR processor component 303 may map each of the record data fields 351 to a respective database source 305 for data to populate the respective data field 351, such that the respective database source 305 has at least a predetermined level of authoritativeness based upon the assigned priority of the respective data field 351. For example, if the assigned priority of a data field 351 is relatively high, then the database source 305 assigned to the data field 351 should have a relatively high level of authoritativeness. Conversely, if the assigned priority of a data field 351 is relatively low, then the database source 305 assigned to the data field 351 may have at least a relatively low level of authoritativeness. In at least some embodiments, a predetermined level means that the value of the level is known or knowable in advance of when the value of the level is used in a process, calculation, threshold comparison, etc.

Next, process 600 transitions to step 609, at which VGR processor component 303 may retrieve via database-facing communication interface 321, 323 or 327 coupled to VGR processor component 303, data for each data field 351 from the database source 305 mapped to the respective data field 351.

Next, process 600 transitions to step 611, at which VGR processor component 303 may assemble the retrieved data for each data field 351 to produce the virtual trusted database record.

FIG. 7A illustrates an optional sub-process 700 usable with process 600 to produce a virtual trusted database record, in accordance with an embodiment of the present disclosure. Process 700 begins at step 701, at which VGR processor component 303 retrieves, via the database-facing communication interface 321, 323 or 327, additional data for a data field from a second database source 305 mapped to the respective data field 351.

Next sub-process 700 transitions to step 703 at which data for the data field is reconciled with the additional data for the data field, to produce reconciled data.

Next sub-process 700 transitions to step 705 at which the reconciled data is incorporated into the virtual trusted database record. In some embodiments, reconciling data may include a step of identifying duplicate records by use of proximity and matching metrics.

FIG. 7B illustrates an optional sub-process 720 usable with process 600 to produce a virtual trusted database record, in accordance with an embodiment of the present disclosure. Process 720 begins at step 721, at which VGR processor component 303 retrieves, from a master data repository 329 stored in the memory 311, data for a record data field 305.

FIG. 7C illustrates an optional sub-process 740 usable with process 600 to produce a virtual trusted database record, in accordance with an embodiment of the present disclosure. Process 740 begins at step 741, at which VGR processor component 303 obtains a quality score of the retrieved data. Next, process 740 transitions to step 742 at which VGR processor component 303 assembles only the retrieved data for each data field 351 that exceeds a predetermined quality score threshold, in order to produce the virtual trusted database record.

Embodiments of the present disclosure include a system having one or more processing units coupled to one or more memories. The one or more memories may be configured to store software that, when executed by the one or more processing unit, allows practice of the embodiments described herein.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present disclosure may be dependent on various considerations, such as the speed or efficiency requirements of the system, the particular function, and the particular software or hardware systems being utilized.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

We claim:

1. A method to produce a virtual trusted database record, the method comprising:
   receiving, by a processor coupled to a user-facing communication interface and to a memory, a request for the virtual trusted database record, wherein the virtual trusted database record comprises a plurality of record data fields;
   identifying a business context of the request;
   assigning, by the processor, a respective priority to each of the record data fields, based upon the business context;
   mapping, by the processor, each of the record data fields to a respective database source for data to populate the respective data field, wherein the respective database source has at least a predetermined level of authoritativeness based upon the assigned priority of the respective data field;
   retrieving, by the processor via a database-facing communication interface coupled to the processor, data for each data field from the database source mapped to the respective data field;
   obtaining, by the processor, a quality score of the retrieved data; and
   assembling only the retrieved data for each data field that exceeds a predetermined quality score threshold, in order to produce the virtual trusted database record.

2. The method of claim 1, wherein the request for the virtual trusted database record comprises the business context of the request.

3. The method of claim 1, wherein the business context of the request is inferred from a characteristic of a requestor of the request.

4. The method of claim 1, wherein the business context of the request comprises an identification of an intended usage of the virtual trusted database record.

5. The method of claim 1, wherein the business context of the request comprises an identification of a format for the virtual trusted database record.

6. The method of claim 1, wherein the business context of the request comprises an identification of a source of data to include in the virtual trusted database record.

7. The method of claim 1, wherein the business context of the request comprises geo-location information of a requestor of the request.

8. The method of claim 1, further comprising steps of:
   retrieving, by the processor via the database-facing communication interface coupled to the processor, additional data for a data field from a second database source mapped to the respective data field; and
   reconciling data for the data field with the additional data for the data field, to produce reconciled data; and
   incorporating the reconciled data into the virtual trusted database record.

9. The method of claim 8, wherein reconciling data comprises the step of identifying duplicate records by use of proximity and matching metrics.

10. The method of claim 1, further comprising steps of:
    retrieving, from a master data repository stored in the memory, data for a record data field; and
    incorporating data from the master data repository into the virtual trusted database record.

11. A system to produce a virtual trusted database record, the system comprising:
    a processor coupled to a user-facing communication interface and to a memory, the processor configured to execute sets of programmed instructions stored in the memory, the sets of programmed instructions providing steps of:
    receiving, a request for the virtual trusted database record, wherein the virtual trusted database record comprises a plurality of record data fields;
    identifying a business context of the request;
    assigning a respective priority to each of the record data fields, based upon the business context;
    mapping each of the record data fields to a respective database source for data to populate the respective data field, wherein the respective database source has at least a predetermined level of authoritativeness based upon the assigned priority of the respective data field;
    retrieving via a database-facing communication interface coupled to the processor, data for each data field from the database source mapped to the respective data field;

obtaining, by the processor, a quality score of the retrieved data; and assembling only the retrieved data for each data field that exceeds a predetermined quality score threshold, in order to produce the virtual trusted database record.

12. The system of claim 11, wherein the request for the virtual trusted database record comprises the business context of the request.

13. The system of claim 11, wherein the business context of the request is inferred from a characteristic of a requestor of the request.

14. The system of claim 11, wherein the business context of the request comprises an identification of an intended usage of the virtual trusted database record.

15. The system of claim 11, wherein the business context of the request comprises an identification of a format for the virtual trusted database record.

16. The system of claim 11, wherein the business context of the request comprises an identification of a source of data to include in the virtual trusted database record.

17. The system of claim 11, wherein the business context of the request comprises geo-location information of a requestor of the request.

18. The system of claim 11, wherein the processor is further configured:

to retrieve via the database-facing communication interface coupled to the processor, additional data for a data field from a second database source mapped to the respective data field; and to reconcile data for the data field with the additional data for the data field, to produce reconciled data; and to incorporate the reconciled data into the virtual trusted database record.

19. The system of claim 18, wherein the processor is further configured:

to retrieve, from a master data repository stored in the memory, data for a record data field; and to incorporate data from the master data repository into the virtual trusted database record.

\* \* \* \* \*